US009536102B2

United States Patent
Margolin

(10) Patent No.: US 9,536,102 B2
(45) Date of Patent: *Jan. 3, 2017

(54) PRIVACY-PROTECTIVE DATA TRANSFER

(71) Applicant: Google Inc., Mountain View, CA (US)

(72) Inventor: Ben Margolin, San Mateo, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,581

(22) Filed: Feb. 18, 2016

(65) Prior Publication Data

US 2016/0171227 A1 Jun. 16, 2016

Related U.S. Application Data

(63) Continuation of application No. 14/326,151, filed on Jul. 8, 2014, now Pat. No. 9,298,939, which is a (Continued)

(51) Int. Cl.
G06F 7/04 (2006.01)
H04N 7/16 (2011.01)
(Continued)

(52) U.S. Cl.
CPC .......... G06F 21/6209 (2013.01); G06F 21/10 (2013.01); G06F 21/606 (2013.01);
(Continued)

(58) Field of Classification Search
CPC .......... G06F 21/10; G06F 21/12; G06F 21/60; G06F 21/62; G06F 21/6209; H04L 9/08; H04L 9/28; H04L 29/06; H04L 63/04; H04L 63/0428; H04L 63/0471
(Continued)

(56) References Cited

U.S. PATENT DOCUMENTS

| 5,953,419 A | 9/1999 | Lohstroh et al. |
| 6,874,085 B1 | 3/2005 | Koo et al. |

(Continued)

OTHER PUBLICATIONS

A Symmetric Key Cryptographic Algorithm, Ayushi, Hindu College of Engineering, IJCA, vol. 1, No. 15, May 2010 www.ijcaonline.org/journal/number15/pxc387502.pdf, 4 pgs.

Primary Examiner — Jayesh Jhaveri
(74) Attorney, Agent, or Firm — Morgan, Lewis & Bockius LLP

(57) ABSTRACT

A method receives authentication credentials for a user from a client device and receives a request from the user for content stored on a remote storage system. A portion of the content is encrypted and a corresponding decryption key is available only at the computer system. The remaining portion of the content is unencrypted. The method retrieves the content from the remote storage system and uses the received credentials to determine whether the user is authorized to view the encrypted portion. When the user is not authorized, the method forms alternative content by replacing the encrypted portion with a substitute element and transmits the alternative content to the client device. When the user is authorized, the method decrypts the encrypted portion of the content using the decryption key, and combines the decrypted portion with the unencrypted portion to form updated content. The updated content is transmitted to the client device.

20 Claims, 11 Drawing Sheets

Related U.S. Application Data continuation of application No. 13/403,836, filed on Feb. 23, 2012, now Pat. No. 8,776,249.

(60) Provisional application No. 61/474,226, filed on Apr. 11, 2011.

(51) Int. Cl.
| | | |
|---|---|---|
| *G06F 17/30* | (2006.01) | |
| *G06F 21/62* | (2013.01) | |
| *G06F 21/10* | (2013.01) | |
| H04L 29/06 | (2006.01) | |
| G06F 21/60 | (2013.01) | |
| H04L 9/28 | (2006.01) | |
| H04L 9/08 | (2006.01) | |
| G06F 21/12 | (2013.01) | |
| H04N 21/2347 | (2011.01) | |
| H04N 21/2743 | (2011.01) | |

(52) U.S. Cl.
CPC .......... *H04L 63/0471* (2013.01); *G06F 21/12* (2013.01); *G06F 21/60* (2013.01); *G06F 21/62* (2013.01); *H04L 9/08* (2013.01); *H04L 9/28* (2013.01); *H04L 29/06* (2013.01); *H04L 63/04* (2013.01); *H04L 63/0428* (2013.01); *H04N 21/2347* (2013.01); *H04N 21/2743* (2013.01)

(58) Field of Classification Search
USPC ............ 726/26–30; 713/160–161, 189, 193; 380/42, 277
See application file for complete search history.

(56) References Cited

U.S. PATENT DOCUMENTS

| | | | |
|---|---|---|---|
| 7,334,124 B2* | 2/2008 | Pham | H04L 63/102 |
| | | | 380/37 |
| 7,343,014 B2 | 3/2008 | Sovio et al. | |
| 7,877,594 B1 | 1/2011 | DiSanto et al. | |
| 7,917,771 B2 | 3/2011 | Forlenza et al. | |
| 8,009,831 B2 | 8/2011 | Chou et al. | |
| 8,302,178 B2 | 10/2012 | Camiel | |
| 8,542,823 B1 | 9/2013 | Nguyen et al. | |
| 8,613,102 B2 | 12/2013 | Nath | |
| 8,619,994 B2* | 12/2013 | Lee | G06F 21/10 |
| | | | 370/277 |
| 8,938,619 B2* | 1/2015 | Swaminathan | G06F 21/10 |
| | | | 380/37 |
| 2002/0091928 A1 | 7/2002 | Bouchard et al. | |
| 2004/0111610 A1 | 6/2004 | Slick et al. | |
| 2005/0091499 A1 | 4/2005 | Forlenza et al. | |
| 2006/0005017 A1* | 1/2006 | Black | H04L 63/0428 |
| | | | 713/165 |
| 2006/0075228 A1 | 4/2006 | Black et al. | |
| 2007/0083467 A1 | 4/2007 | Lindahl et al. | |
| 2008/0118064 A1 | 5/2008 | Bhogal et al. | |
| 2008/0270807 A1 | 10/2008 | Forlenza et al. | |
| 2010/0313117 A1* | 12/2010 | Fukasawa | G06F 21/10 |
| | | | 715/243 |
| 2010/0325422 A1 | 12/2010 | Gnanasambandam et al. | |
| 2011/0040967 A1* | 2/2011 | Waller | G06F 21/10 |
| | | | 713/161 |
| 2011/0289309 A1* | 11/2011 | Tanenbaum | H04L 9/0825 |
| | | | 713/150 |

* cited by examiner

PRIVACY-PROTECTIVE DATA TRANSFER

RELATED APPLICATIONS

This application is a continuation of U.S. patent application Ser. No. 14/326,151, filed Jul. 8, 2014, now U.S. Pat. No. 9,298,939, entitled "Privacy-Protective Data Transfer," which is a continuation of U.S. patent application Ser. No. 13/403,836, filed Feb. 23, 2012, now U.S. Pat. No. 8,776,249, entitled "Privacy-Protective Data Transfer," which claims priority to U.S. Provisional Patent Application No. 61/474,226, entitled "Privacy-Protective Data Transfer and Storage," filed Apr. 11, 2011, all of which are incorporated by reference herein in their entirety.

This application is related to U.S. patent application Ser. No. 13/403,833, now U.S. Pat. No. 8,782,392, entitled "Privacy-Protective Data Transfer and Storage," filed Feb. 23, 2012, which is incorporated by reference herein in its entirety.

TECHNICAL FIELD

The disclosed embodiments relate generally to data management. More particularly, the disclosed embodiments relate to data transfer and storage that protects privacy interests in the data.

BACKGROUND

Data files can be stored remotely at remote third-party sites (or company servers) rather than locally. Benefits of remote storage include data backup and redundancy, and remote access to the particular data files by one or more users. A data file to be stored remotely may contain private or confidential content, and the private content needs to be protected from attacks on the third-party site from without or within. To protect the private content, the data file may be transmitted in secure data transmissions between local systems and the third-party site, and the data file may be encrypted and stored in the encrypted form. However, in such an environment the encryption of the data file is typically handled by the third-party site, and the decryption keys are held by the third-party site. Thus, the privacy of the data file is still vulnerable to compromise by malicious operators of the third-party site or an external attack on the third-party site. Alternatively, each user of a data file with private content can encrypt the file prior to transmitting it to the third party site, but this requires each user to have the appropriate key or keys for encrypting the document each time it is transmitted to others and for decrypting the data file when it is accessed. This arrangement is inconvenient due to the need of multiple users to manage keys and also insecure due to the sharing of keys.

SUMMARY

According to some embodiments, a method is performed at a computer system having one or more processors and memory storing one or more programs executed by the one or more processors. The method includes generating a document, including marking one or more portions of the document as private, and sending the document to an intermediary system for transmission to a destination system, where prior to the document being transmitted to the destination system, the marked portions of the document are encrypted by the intermediary system using a key that is unavailable to the destination system.

According to some embodiments, a client system includes one or more processing units, and memory storing one or more programs be executed by the one or more processing units. The one or more programs include instructions for generating a document, including marking one or more portions of the document as private, and sending the document to an intermediary system for transmission to a destination system, where prior to the document being transmitted to the destination system, the marked portions of the document are encrypted by the intermediary system using a key that is unavailable to the destination system.

According to some embodiments, a non-transitory computer readable storage medium stores one or more programs configured for execution by a computer. The one or more programs include instructions for generating a document, including marking one or more portions of the document as private, and sending the document to an intermediary system for transmission to a destination system, where prior to the document being transmitted to the destination system, the marked portions of the document are encrypted by the intermediary system using a key that is unavailable to the destination system.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1:
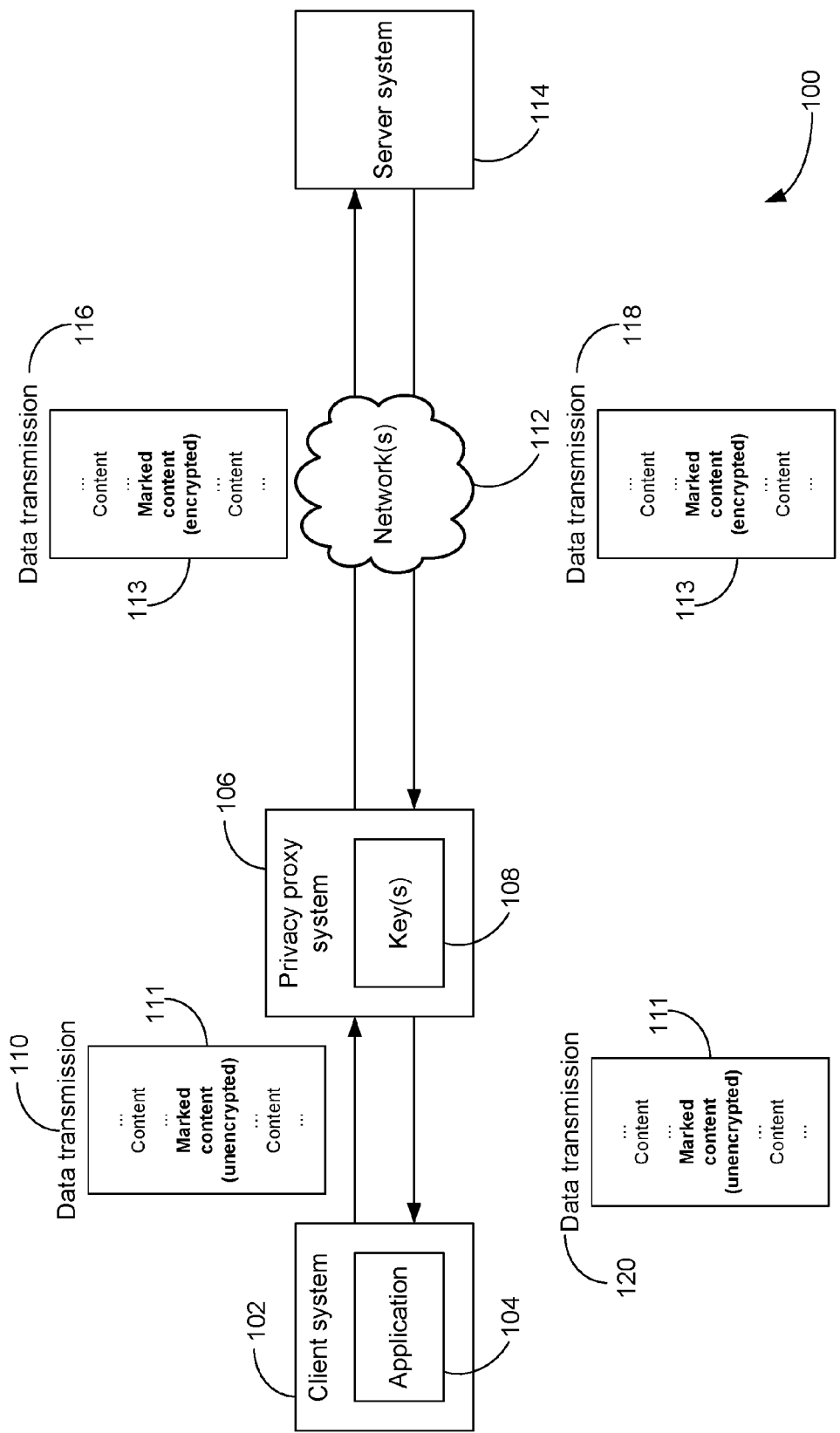
FIG. 1 is a block diagram illustrating a privacy-protective data transfer and storage system, according to some embodiments.

FIG. 1 is a block diagram illustrating a privacy-protective data transfer and storage system 100, according to some embodiments. A data file 111 is located at a client system 102. In some embodiments, the data file 111 is an electronic document of any suitable type, such as a plain text document, MICROSOFT WORD document, Portable Document Format (PDF) document, MICROSOFT EXCEL spreadsheet, MICROSOFT POWERPOINT presentation, email message, and so forth. In some other embodiments, the data file 111 is an electronic document or an image or graphics file, video file, or audio file. The contents of the data file 111 may include text, graphics, images, audio, video, or any combination thereof. For convenience and ease of understanding, hereinafter a data file may also be referred to as a document.

The client system 102 (sometimes called a "client computer," or "client device" or "client") may be any computer or device able to process a data file or document (e.g., document 111) and transmit (or "send") and receive data files or documents to other systems. Examples of client systems 102 include, without limitation, desktop computers, laptop computers, tablet computers, mobile devices such as mobile phones, personal digital assistants, set-top boxes, or any combination of the above.

Among the contents of a document 111 are one or more portions (or the entirety) of the contents that are demarcated or otherwise marked or designated as private or confidential, or more generally, demarcated or otherwise marked or designated as requiring a more restrictive level of security and/or privacy (hereinafter collectively referred to as "marked as private"). For example, a document 111 may have one or more portions of its contents (e.g., certain text portions, certain graphics or images, etc.) that includes sensitive information or for which viewing and/or editing is restricted to a more limited set of users than the remainder of the contents of the document 111. The portions for which more restrictive viewing or editing rights are required may be marked as private.

A document 111 is generated at a client system 102 by an application 104. A user of client system 102 may use the application 104 to create a new document and to demarcate or otherwise mark or designate one or more discrete portions of the contents of the created document as private (hereinafter collectively referred to as "mark as private"). A user may also use the application 104 to mark discrete portions of the contents of a document created outside of the application 104 as private, and the application 104 generates a version of the document that has the private portions marked. Whether a document 111 was initially created within the application 104 or without, a document 111 that is modified from within the application 104 may include one or more portions that are marked as private. In some embodiments, the portions that are marked as private are marked as such in accordance with user input (e.g., a user selecting particular text, images, and/or other content in a document and then activating a command in the application 104 to mark the selected portion(s) as private).

The document 111 is sent to a privacy proxy system 106 in a data transmission 110. In some embodiments, the data transmission 110 is an encrypted or secure transmission. For example, data transmission 110 may be sent in accordance with the Secure Sockets Layer (SSL) or the Transport Layer Security (TLS) protocol. At the privacy proxy system 104, when the encrypted data transmission 110 is decrypted to access the document 111, the marked portions in the document 111 are unencrypted. In some other embodiments, the data transmission 110 is an unencrypted transmission; the marked portions in the document 111 are unencrypted during the transmission and at receipt by the privacy proxy system 106.

The privacy proxy system 106 may be any computer or device (or a system of multiple computers/devices, e.g., multiple servers) able to process a data file or document and transmit (or "send") and receive data files or documents to and from other systems. Examples of a privacy proxy system 106 include, without limitation, a server computer system. In some embodiments, the privacy proxy system 106 is implemented as a web proxy server system, with additional functionality related to the processing of documents with portions marked as private (e.g., document content encryption and decryption, encryption key and decryption key management, etc.).

After receiving the data transmission 110 and extracting the document 111 from the data transmission 110, the privacy proxy system 106 encrypts the marked portions of the document 111. The unmarked portions of the document 111 remain unencrypted. Thus, the result of the encryption is a data file or document 113 that includes the marked portions, which are encrypted, and the unmarked portions, which remain unencrypted, of the document 111. For ease of understanding, data file or document 113 may be referred to as a partially encrypted data file or document 113. In some embodiments, the privacy proxy system 106 encrypts the marked portions of the document 111 using an appropriate key from one or more encryption and/or decryption keys 108 in accordance with any suitable key-based encryption algorithm.

The partially encrypted document 113 is sent, through network(s) 112, in a data transmission 116 to a server system 114. In some embodiments, the data transmission 116 is an encrypted or otherwise secure transmission. For example, data transmission 116 may be sent using the Secure Sockets Layer (SSL) or the Transport Layer Security (TLS) protocol.

In some embodiments, a user may be notified or choose to send documents to the server system 114 through the privacy proxy system 106. In some embodiments, when the privacy proxy system 106 is bypassed, the sent documents are not encrypted by the privacy proxy system 106 as described above, and alternative security and privacy measures may be used in place of the privacy proxy system 106 (e.g., encryption of the document at the client).

Server system 114 may be any computer or device (or a system of multiple computers/devices) able to process a data file or document and transmit (or "send") and receive data files or documents to other systems. Examples of server system 116 include, without limitation, a server computer system.

The server system 114 receives the data transmission 116 and extracts the partially encrypted document 113 from the data transmission 116. The server system 114 is not provided the appropriate key(s) 108 for decrypting the encrypted marked portions of the partially encrypted document 113. Thus, the server system 114 does not decrypt the encrypted marked portions of the partially encrypted document 113. Whatever processing server system 114 performs on the partially encrypted document 113, the processing is performed while the marked portions remain encrypted. The server system 114 stores the encrypted document 113 in memory or some storage medium (e.g., non-volatile storage, such as a hard disk drive).

In some embodiments, the server system 114 indexes the encrypted document 113 (e.g., for searching). The partially encrypted document 113 is indexed based on the unencrypted unmarked portions, as the marked portions remain encrypted.

The server system 114 may send the partially encrypted document 113 to a client system 102 (e.g., in response to a request from the client system 102 for the partially encrypted document 113, with the request from the client system 102 corresponding to a request made by a user for the original document 111 corresponding to the partially encrypted document 113) through the privacy proxy system 106. The server system 114 sends the partially encrypted document 113, through network(s) 112, in a data transmission 118. The data transmission 118 is sent to the privacy proxy system 106. In some embodiments, the data transmission 118 is an encrypted or otherwise secure transmission. For example, data transmission 118 may be sent using the Secure Sockets Layer (SSL) or the Transport Layer Security (TLS) protocol.

The privacy proxy system 106 receives the data transmission 118 and extracts the partially encrypted document 113 from the data transmission 118. Using the encryption/decryption key(s) 108, the privacy proxy system 106 decrypts the encrypted marked portions of encrypted document 113 to reconstitute the document 111. The document 111 is sent in a data transmission 120 to the client system 102. In some embodiments, the data transmission 120 is an encrypted or otherwise secure transmission. For example, data transmission 120 may be sent using the Secure Sockets Layer (SSL) or the Transport Layer Security (TLS) protocol.

The client system 102 receives the data transmission 120 and extracts the document 111 from the data transmission 120. The document 111 may be displayed in the application 104.

Figure 2:
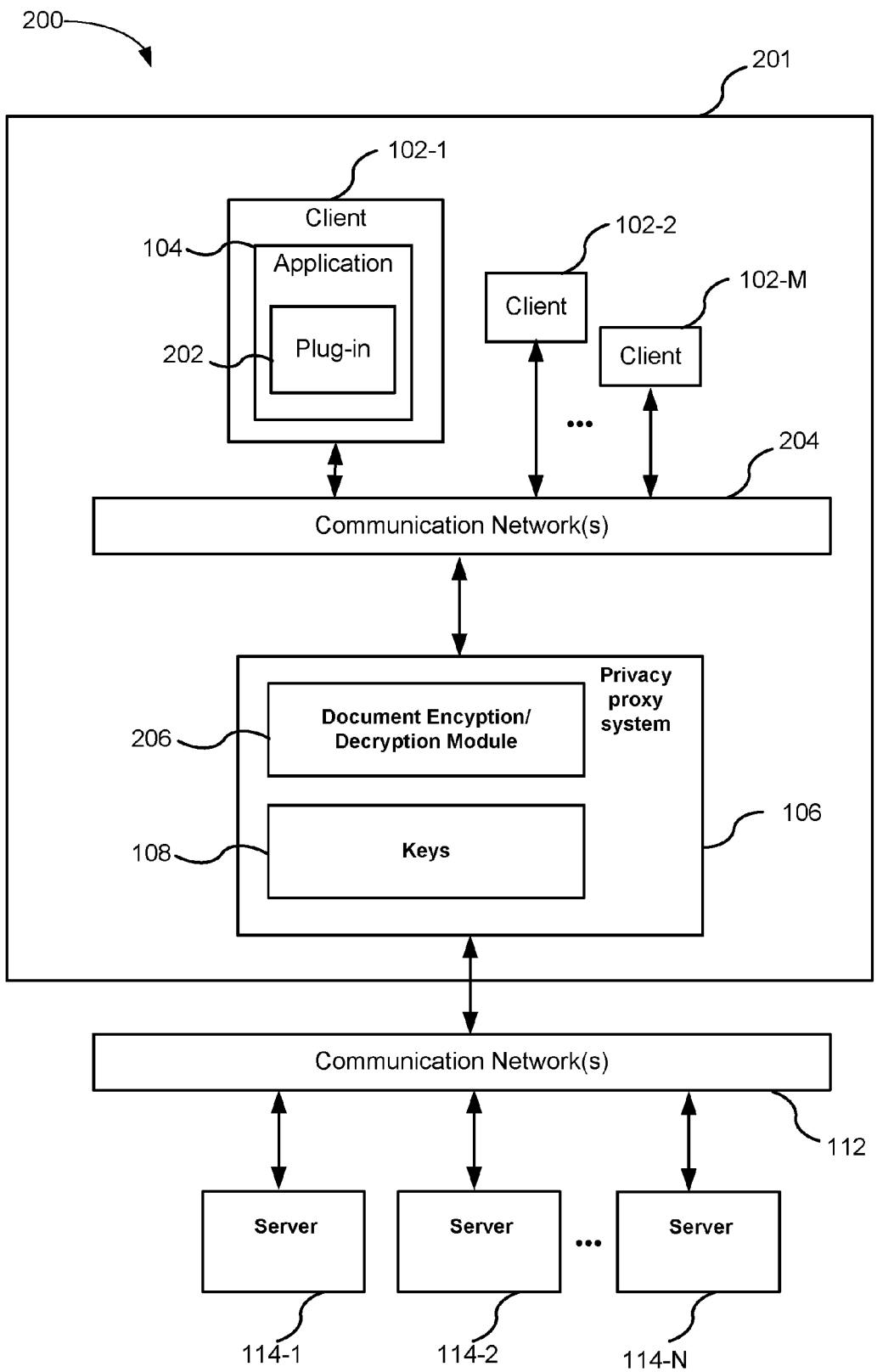
FIG. 2 is a block diagram illustrating a distributed computer system, according to some embodiments.

FIG. 2 is a block diagram illustrating a distributed computer system 200, according to some embodiments. In some embodiments, the distributed computer system 200 is an implementation of the privacy-protective data transfer and storage system 100 shown in FIG. 1. The distributed system 200 includes multiple client systems 102-1, 102-2, thru 102-M, and privacy proxy system 106. In some embodiments, the clients 102 and the privacy proxy system 106 are components of a private (e.g., a corporate or enterprise) network environment 201. The client systems 102 and the privacy proxy system 106 may be interconnected by one or more communication networks 204 (e.g., local area networks (LAN), virtual private networking (VPN), etc.) within the private network environment 201.

The private network environment 201 may transmit data to server system 114, which includes servers 114-1, 114-2, thru 114-N. The network environment 201 may be interconnected with the servers 114 through one or more network(s) 112.

In some embodiments, a client system 102 (e.g., client 102-1) includes an application 104 configured to enable the user to mark portions of a document as private. For some applications 104, the capability to enable the user to mark portions of a document as private is provided through the addition of a plug-in 202 to the application 104. Alternatively, the application 104 may have native support for marking of portions of a document as private (e.g., the application was designed and programmed to support the feature from the start).

The privacy proxy system 106 includes the encryption/decryption key(s) 108 and a document encryption/decryption module or application 206. The encryption/decryption module 206 uses the key(s) 108 to encrypt or decrypt marked portions in documents. In some embodiments, the privacy proxy system 106 is a web proxy server system in the network environment 201 (e.g., a content filtering web proxy for a corporate network). In some embodiments, the key(s) 108 are kept within the private network environment 201 and not provided to entities outside of the private network environment 201, such as server system 114. By keeping the key(s) 108 within the private network environment 201, the privacy of the marked portions of a document stored at the server system 114 is less likely to be compromised by operators of the server system 114 or by attacks on the server system 114. In some embodiments, the privacy proxy system 106 also includes a key management module (not shown) for automatically, and/or with administrator intervention, managing encryption and decryption keys.

In some embodiments, a document 111 and the corresponding partially encrypted document 113 stored at the server system 114 may be accessible to multiple users in the private network environment 201 but only a subset of those multiple users have rights to read and/or edit the marked portions. When the partially encrypted document 113 is transmitted from the server system 114 to the network environment 201, how the partially encrypted document 113 is processed by the privacy proxy system 106 and presented to a user varies with which user is requesting the corresponding original document 111.

For example, in some embodiments, if a user with full rights to the entire document makes a request for the document 111 at a client 102, the privacy proxy system 106, after receiving the partially encrypted document 113, decrypts the marked portions of the partially encrypted document 113 (i.e., reconstituting the document 111) and sends the document 111 to the client 102. The application 104, recognizing that the user has full rights to the document (e.g., by comparing the user's login credentials at the client 102 or other authentication credentials to the document's rights metadata), displays the entire document in the clear to the user and enables editing by the user. If the user does not have reading rights to the marked portions, the privacy proxy system 106 may omit the decryption of the partially encrypted document 113 and send the partially encrypted document 113 to the client 102. The application 104 displays the unmarked portions of the partially encrypted document 113 in the clear but the encrypted marked portions are replaced with other displayed content, such as a message or symbol indicating that the marked portions of the document are encrypted. Alternatively, the privacy proxy system 106 decrypts the partially encrypted document 113 but the application 104 displays the unmarked portions in the clear and displays other content in place of the decrypted marked portions, such as a message or symbol indicating that the marked portions of the document are private.

In some embodiments, the privacy proxy system 106 decrypts the partially encrypted document 113 regardless of whether the requesting user has rights to the marked portions, and the application 104 is responsible for presenting the reconstituted document 111 in accordance with the rights that the requesting user has. In some embodiments, the privacy proxy system 106 decrypts the partially encrypted document 113 in accordance with the requesting user's rights level; the partially encrypted document is not decrypted for a user who does not have the rights to read the marked portions. Examples of how a marked portion of a document is presented to a user at a client 102 are further described below with reference to FIGS. 6A and 6B.

In some other embodiments, the privacy proxy system 106 decrypts the partially encrypted document 113 if the proper decryption key is available at the privacy proxy system 106, and does not decrypt the partially encrypted document 113 if the proper decryption key is not available, and the reconstituted document 111 may be presented to the user at the client 102 in a manner described below with reference to FIGS. 6A-6B. Whether the proper decryption key is available at the privacy proxy system 106 or not is based on management of decryption keys by key management systems implemented for the private network environment 201 (e.g., at the privacy proxy system 106).

In some further embodiments, the decryption of the partially encrypted document 113 corresponding to the original document 111, or not, based on availability of the proper decryption key described above is irrespective of rights or permissions associated with the original document 111 and is transparent to the user. In other words, management of document rights or permissions (e.g., read rights, edit rights, full rights, and the like) and encryption/decryption of documents are handled separately. For example, a user who has no read (or higher) rights to the document 111 cannot request it (e.g., attempts by the user to request the document 111 are denied), and the partially encrypted document 113 corresponding to the document 111 is not sent from the server 114 to the privacy proxy system 116, whether or not the proper key is available. If the user does have read or higher rights to the document 111 and makes a request for it, the partially encrypted document 113 corresponding to the document 111 is sent from the server 114 to the privacy proxy system 116, but whether the privacy proxy system 116 decrypts the partially encrypted document 113 depends on the availability of the proper key; the user's rights level is irrelevant to the decision to decrypt or not.

Figure 3:
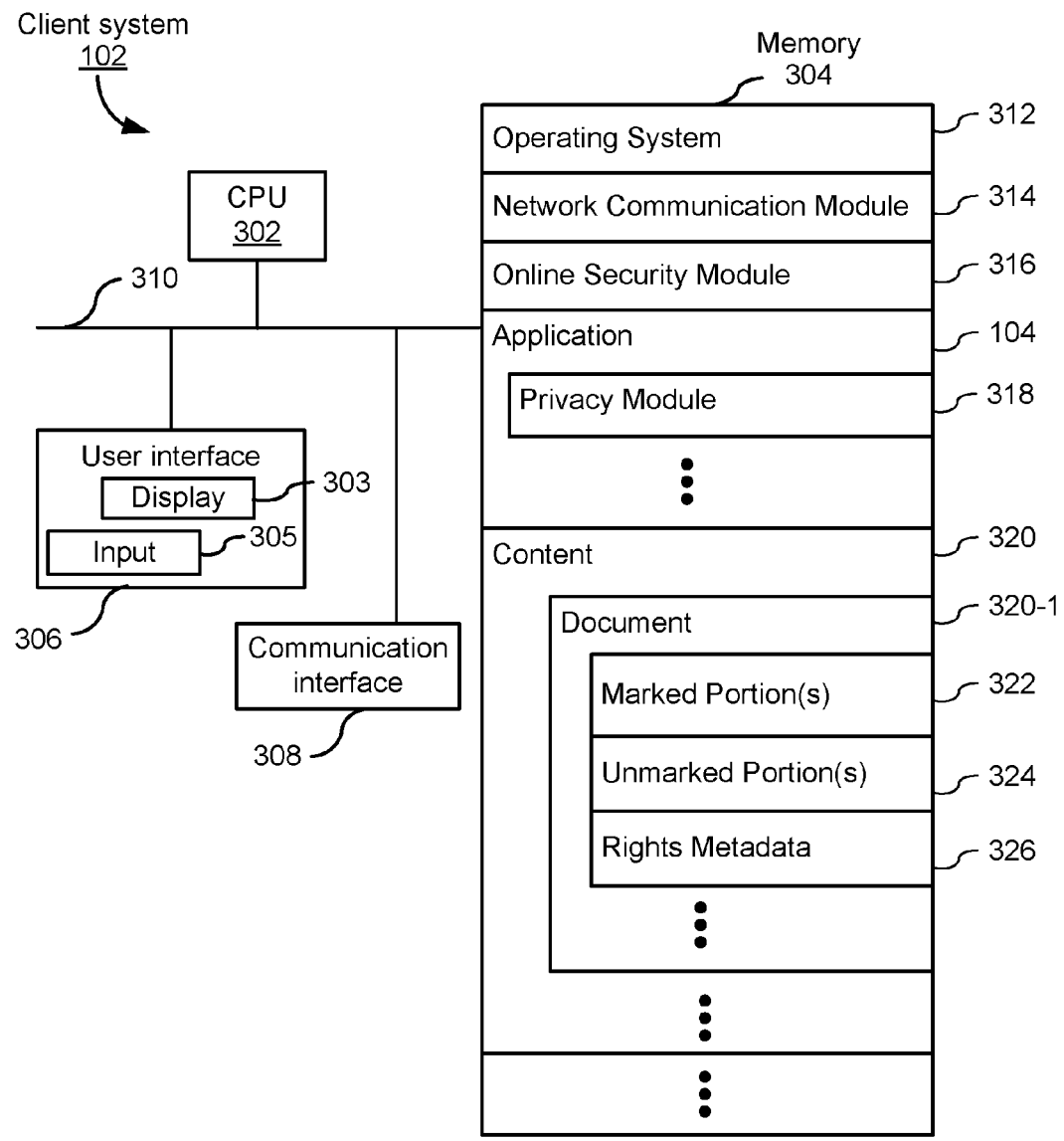
FIG. 3 is a block diagram illustrating a client system, according to some embodiments.

FIG. 3 is a block diagram illustrating a client system 102, according to some embodiments. The client system 102 typically includes one or more processing units (CPU's) 302, one or more network or other communications interfaces 308, memory 304, and one or more communication buses 310 for interconnecting these components. The client system 102 includes a user interface 306. The user interface 306 includes a display device 303 and optionally includes an input means such as a keyboard, mouse, or other input buttons 305. Alternatively or in addition the display device 303 includes a touch sensitive surface (not shown), in which case the display device 303 is a touch sensitive display. In client systems that have a touch sensitive display, a physical keyboard is optional (e.g., a soft keyboard may be displayed when keyboard entry is needed). Furthermore, some client systems use a microphone and voice recognition to supplement or replace the keyboard.

Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the CPU(s) 302. Memory 304, or alternately the non-volatile memory device(s) within memory 304, comprises a non-transitory computer readable storage medium. In some embodiments, memory 304 or the computer readable storage medium of memory 304 stores the following programs, modules and data structures, or a subset thereof:

- an operating system 312 that includes procedures for handling various basic system services and for performing hardware dependent tasks;
- a network communication module 314 that is used for connecting the client system 102 to other computers via the one or more communication network interfaces 308 (wired or wireless) and one or more communication networks, such as the Internet, other wide area networks, local area networks, metropolitan area networks, and so on;
- an online security module 316 for implementing, in conjunction with network communication module 314, secure data transmission and receipt (e.g., data transmission and receipt in accordance with the SSL or TLS protocol);
- one or more client application modules 104 for creating, modifying, and presenting content (e.g., documents); for marking one or more portions, or the whole, of documents as private in accordance with user input; and presenting documents with marked portions differently in accordance with the requesting user's rights to the document and to the marked portions;
- optionally, a privacy module 318, within a client application 104, for implementing functionality related to marking one or more portions, or the whole, of documents as private in accordance with user input; and presenting documents with marked portions differently in accordance with the requesting user's rights to the document and to the marked portions; and
- content 320, such as a document 320-1, which includes one or more marked portions 322, optionally one or more unmarked portions 324, and rights metadata 326 that defines who has what rights (e.g., reading rights, editing rights) to the marked portions 322 and the unmarked portions 324.

The client application modules 104 may be standalone applications stored in the memory 304 or online applications (e.g., web application 418, FIG. 4) whose instructions are downloaded from a server system (e.g., server system 114) and executed in a web browser application at the client system 102.

The rights metadata 326 for a document 320-1 may be set by the creator of the document 320-1 or another user with full rights to the document 320-1. In some embodiments, the rights metadata 326 may be set or modified from within the application 104.

Figure 4:
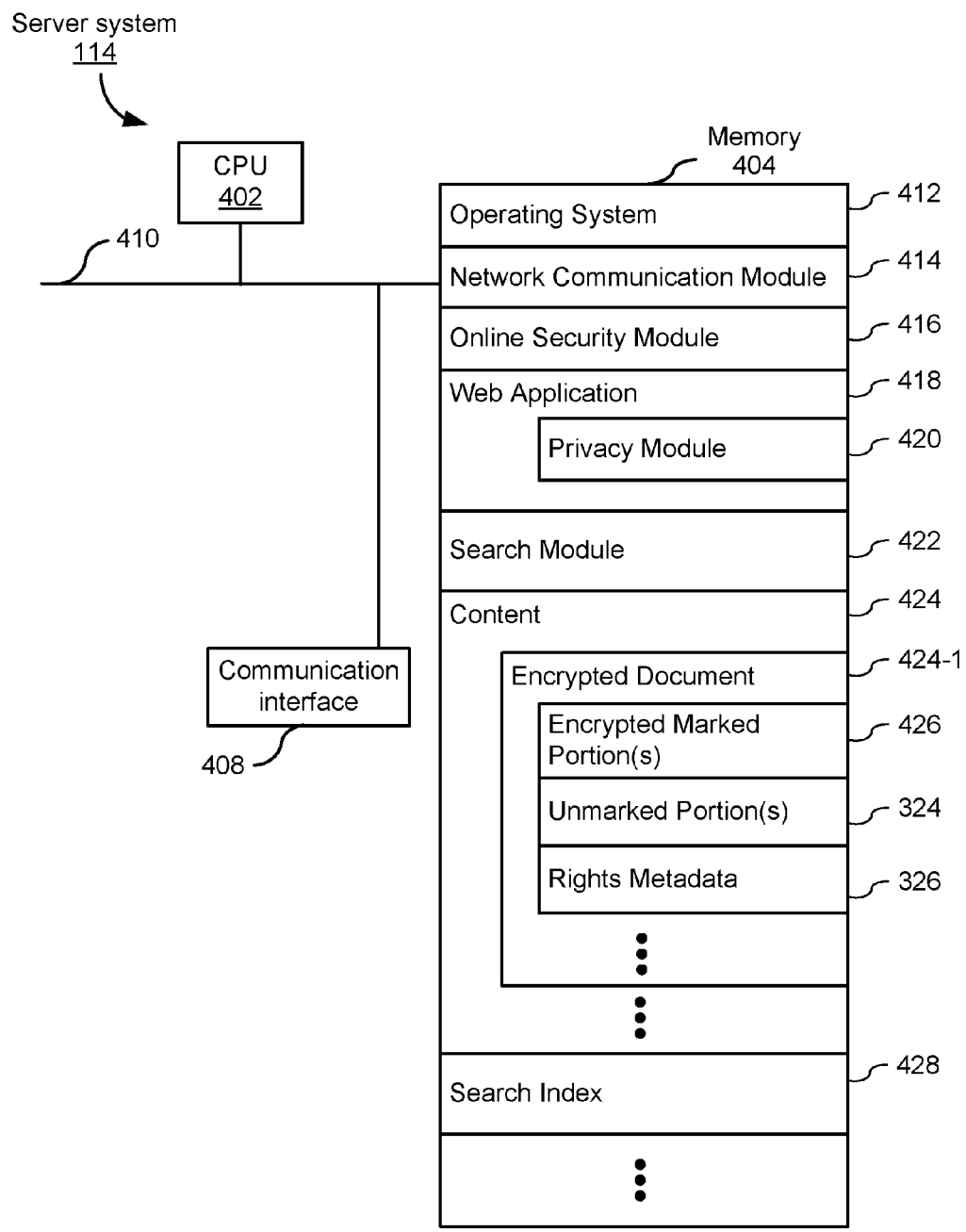
FIG. 4 is block diagram illustrating a server system, according to some embodiments.

FIG. 4 is a block diagram illustrating a server system 114, according to some embodiments. The server system 114 typically includes one or more processing units (CPU's) 402, one or more network or other communications interfaces 408, memory 404, and one or more communication buses 410 for interconnecting these components.

Memory 404 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 404 may optionally include one or more storage devices remotely located from the CPU(s) 402. Memory 404, or alternately the non-volatile memory device(s) within memory 404, comprises a non-transitory computer readable storage medium. In some embodiments, memory 404 or the computer readable storage medium of memory 404 stores the following programs, modules and data structures, or a subset thereof:

- an operating system 412 that includes procedures for handling various basic system services and for performing hardware dependent tasks;
- a network communication module 414 that is used for connecting the server system 114 to other computers via the one or more communication network interfaces 408 (wired or wireless) and one or more communication networks, such as the Internet, other wide area networks, local area networks, metropolitan area networks, and so on;
- an online security module 416 for implementing, in conjunction with network communication module 414, secure data transmission and receipt (e.g., data transmission and receipt in accordance with the SSL or TLS protocol);
- one or more web applications 418, which may be sent to a client system (e.g., client system 102) for execution as an application 104 at the client system, for creating, modifying, and presenting content (e.g., documents); for marking one or more portions, or the whole, of documents as private in accordance with user input; and presenting documents with marked portions differently in accordance with the requesting user's rights to the document and to the marked portions;
- optionally, a privacy module 420, within a web application 418, which may be sent to the client system (e.g., client system 102) for execution as privacy module 318 in conjunction with the execution of a web application 418, for implementing functionality related to marking one or more portions, or the whole, of documents as private in accordance with user input; and presenting documents with marked portions differently in accordance with the requesting user's rights to the document and to the marked portions;
- a search module 422 for indexing content 424 for searching and performing searches on content 424;
- content 424 stored at the server system 114, such as an encrypted document 424-1, corresponding to document 320-1, which includes one or more encrypted marked portions 426, optionally one or more unmarked portions 324, and rights metadata 326 that defines who has what rights (e.g., reading rights, editing rights) to the marked portions 322 and the unmarked portions 324; and
- search index 428 that includes an index of content 424 for searching.

Figure 5:
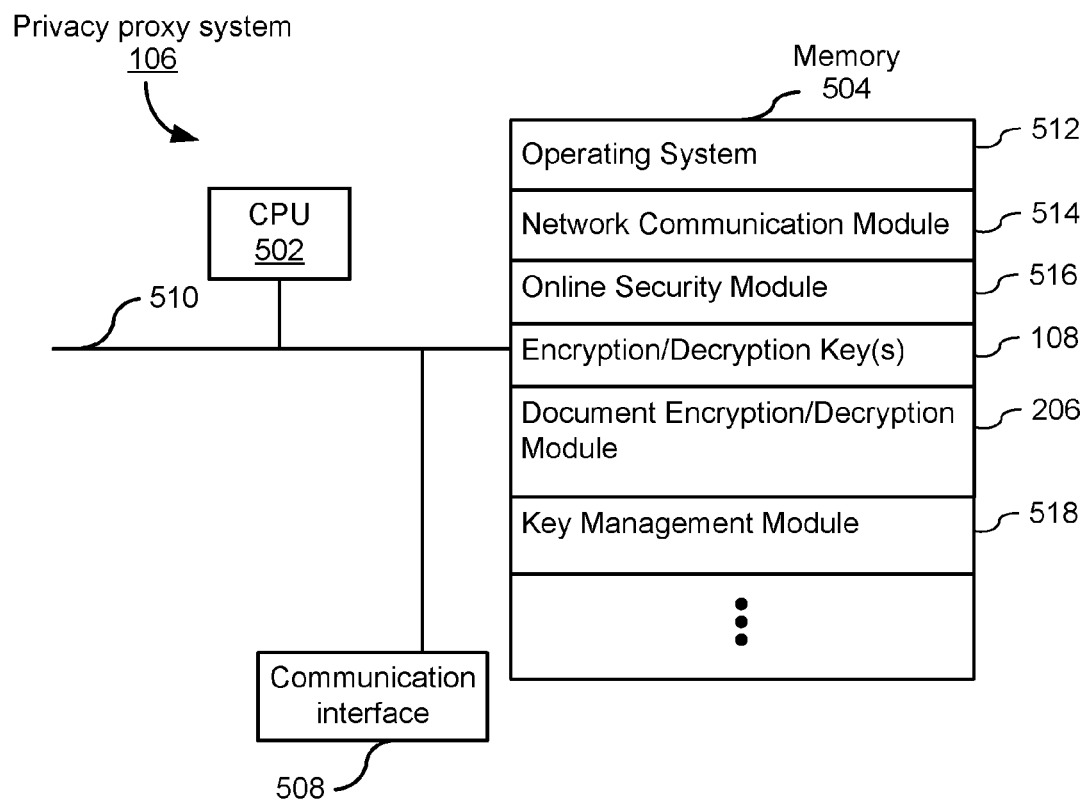
FIG. 5 is a block diagram illustrating a privacy proxy system, according to some embodiments.

FIG. 5 is a block diagram illustrating a privacy proxy system 106, according to some embodiments. The privacy proxy system 106 typically includes one or more processing units (CPU's) 502, one or more network or other communications interfaces 508, memory 504, and one or more communication buses 410 for interconnecting these components.

Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. Memory 504, or alternately the non-volatile memory device(s) within memory 504, comprises a non-transitory computer readable storage medium. In some embodiments, memory 504 or the computer readable storage medium of memory 504 stores the following programs, modules and data structures, or a subset thereof:

- an operating system 512 that includes procedures for handling various basic system services and for performing hardware dependent tasks;
- a network communication module 514 that is used for connecting the privacy proxy system 106 to other computers via the one or more communication network interfaces 508 (wired or wireless) and one or more communication networks, such as the Internet, other wide area networks, local area networks, metropolitan area networks, and so on;
- an online security module 516 for implementing, in conjunction with network communication module 514, secure data transmission and receipt (e.g., data transmission and receipt in accordance with the SSL or TLS protocol);
- one or more encryption/decryption key(s) 108 used in the encryption or decryption of content, such as documents;
- document encryption/decryption module 206 for, in conjunction with key(s) 108, encrypting or decrypting documents; and
- key management module 518 for management of key(s) 108 (e.g., creation or deletion of key(s) 108, defining rights to access the key(s) 108, etc.).

In some embodiments, the management of the key(s) 108 takes place at the privacy proxy system 106. When the privacy proxy system 106 and the clients 102 are within a private network environment 201, an administrator within the private network environment 201 may use the key management module 518 to manage the key(s) 108. This keeps the key management within the private network environment, and the responsibility for managing the key(s) 108 remain with the owners of the documents to be encrypted.

FIGS. 3-5 are intended more as functional descriptions of the various features which may be present in a set of computer systems than as a structural schematic of the embodiments described herein. In practice, and as recognized by those of ordinary skill in the art, items shown separately could be combined and some items could be separated. For example, some items shown separately in these figures could be implemented on single servers and single items could be implemented by one or more servers. The actual number of systems used to implement a privacy proxy and how features are allocated among them will vary from one implementation to another.

Each of the methods described herein with respect to FIGS. 7-10 may be governed by instructions that are stored in a non-transitory computer readable storage medium and that are executed by one or more processors of one or more servers or clients. The above identified modules or programs (i.e., sets of instructions) need not be implemented as separate software programs, procedures or modules, and thus various subsets of these modules may be combined or otherwise re-arranged in various embodiments. Each of the operations shown in FIGS. 7-10, described below, may correspond to instructions stored in a computer memory or non-transitory computer readable storage medium.

Figure 6A:
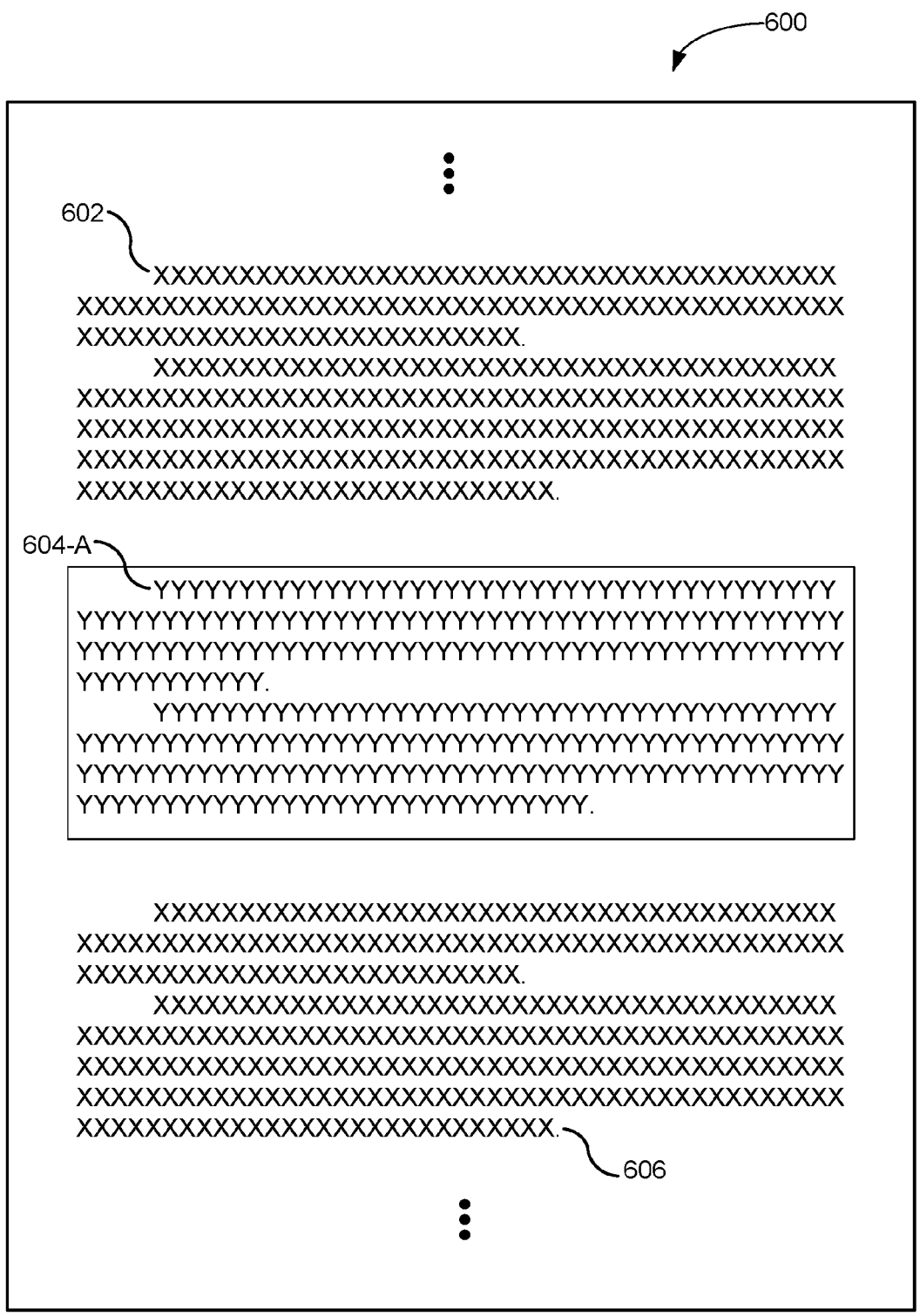
FIGS. 6A-6B are screenshot diagrams illustrating a displayed document with private content, according to some embodiments.
Figure 6B:
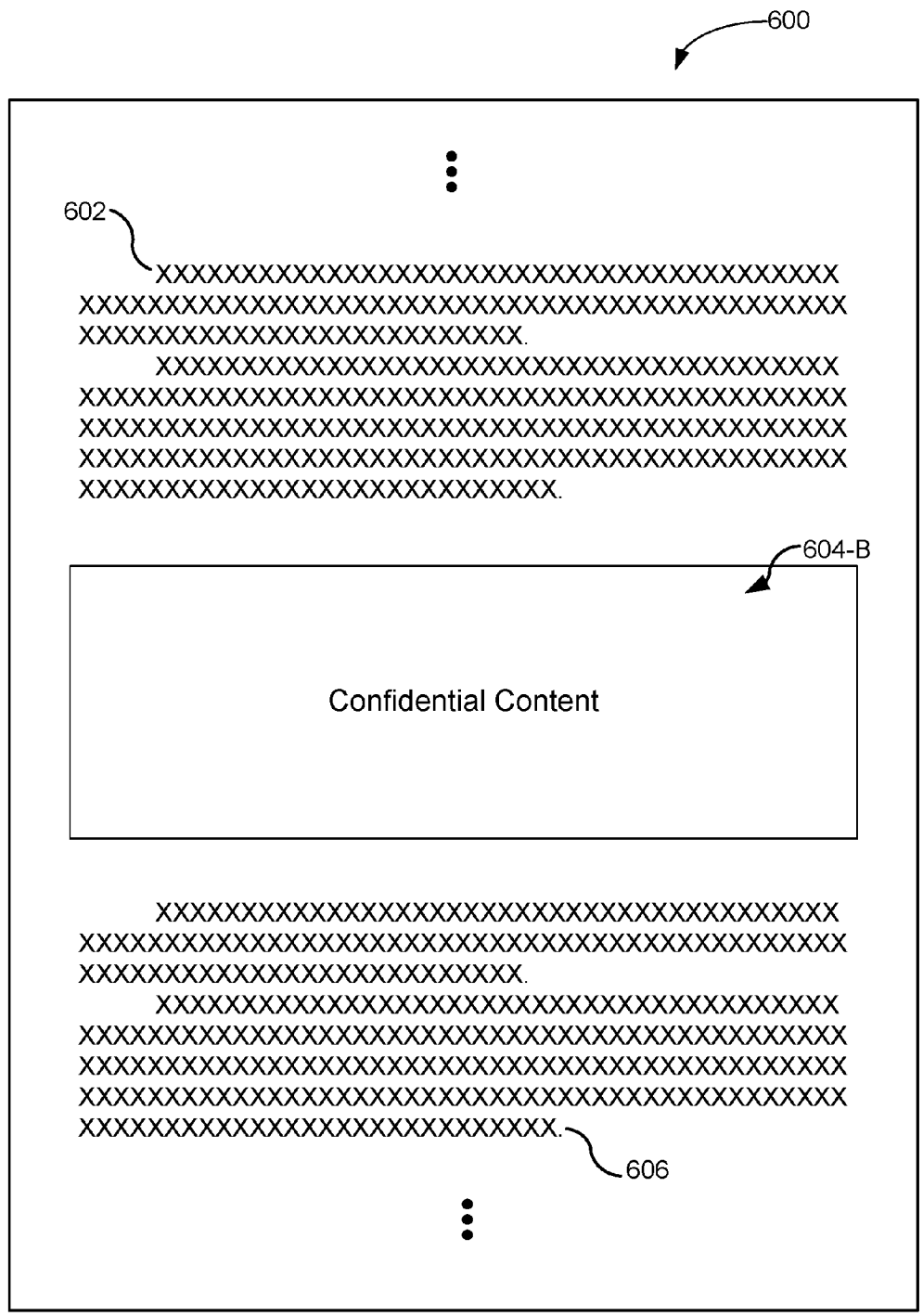

FIGS. 6A and 6B are diagrams illustrating a displayed document 600 with private content, according to some embodiments. As described above, a document (e.g., document 111) may be accessible to multiple users, but only a subset of those users may have rights (e.g., to read and/or edit) portions of the document that are marked as private. Alternatively, a proper key for decrypting a partially encrypted document corresponding to an original document may be or may not be available. When a document is presented to a user at a client device 102, the marked private portions may be presented differently based on the rights of the user or on key availability.

The document 600 includes unmarked content portions 602, 606 and a marked content portion 604. The document 600 may be created or generated, modified, and viewed in an application 104 in a client device 102 and sent, through the privacy proxy system 106, to the server system 114 for storage. The privacy proxy system 106 encrypts the marked portion 604 before sending the document 600 to the server system 114. While stored at the server system 114, the encrypted marked portion 604 remains encrypted (e.g., because the key needed to decrypt the marked portion 604 is not available to the server system 114). A user at a client device 102 may make a request for the document 600, and in response the document 600 is sent by the server system 114 to the privacy proxy system 106.

In some embodiments, in response to the request for the document 600, the privacy proxy system 106 decrypts the marked portion 604 regardless of whether the requesting user has the rights to read the marked portion 604. The application 104 controls how the marked portions are displayed in accordance with the user's rights. In some other embodiments, in response to the request for the document 600, the privacy proxy system 106 decrypts the marked portion 604 if the requesting user has the rights to read the marked portion 604 and omits the decrypting if the requesting user does not have the right to read the marked portion 604. The application 104 replaces the still-encrypted marked portion 604 with other content. In some further embodiments, the privacy proxy system 106 decrypts the marked portion 604 if the proper decryption key is available at the privacy proxy system 106, and does not decrypt the marked portion 604 if the proper decryption key is not available at the privacy proxy system 106.

The privacy proxy system 106 sends the document 600 to the client system 102. At the client system 102, the document 600 is displayed to the requesting user in an application 104. The unmarked portions 602, 606 are displayed in the clear, as shown in FIGS. 6A and 6B. That is, the contents of the unmarked portions 602, 606 are displayed in their original forms. In some embodiments, the marked portion 604 is presented differently in accordance with the rights of the requesting user. If the user has the right to read the marked portion 604, the marked portion 604 is decrypted by the privacy proxy system 106 and presented at the client system 102 in the clear as user-readable marked portion 604-A, as shown in FIG. 6A. If the user does not have the right to read the marked portion 604, alternative content 604-B is displayed in place of the content of the marked portion 604.

In some other embodiments, the marked portion 604 is decrypted if the proper decryption key is available and the decrypted marked portion 604 is displayed in the clear as user-readable marked portion 604-A. If the proper decryption key is not available, the marked portion 604 is not decrypted and alternative content 604-B is displayed in place of the content of the marked portion 604.

In some embodiments, the alternative content 604-B is any of: black bars obscuring the marked portion (e.g., as in a redacted document), a graphic (e.g., a mosaic blur over the content of the marked portion), alternative text (e.g., a message warning that the content in the marked portion is private, as shown in FIG. 6B), or a blank area.

Figure 7A:
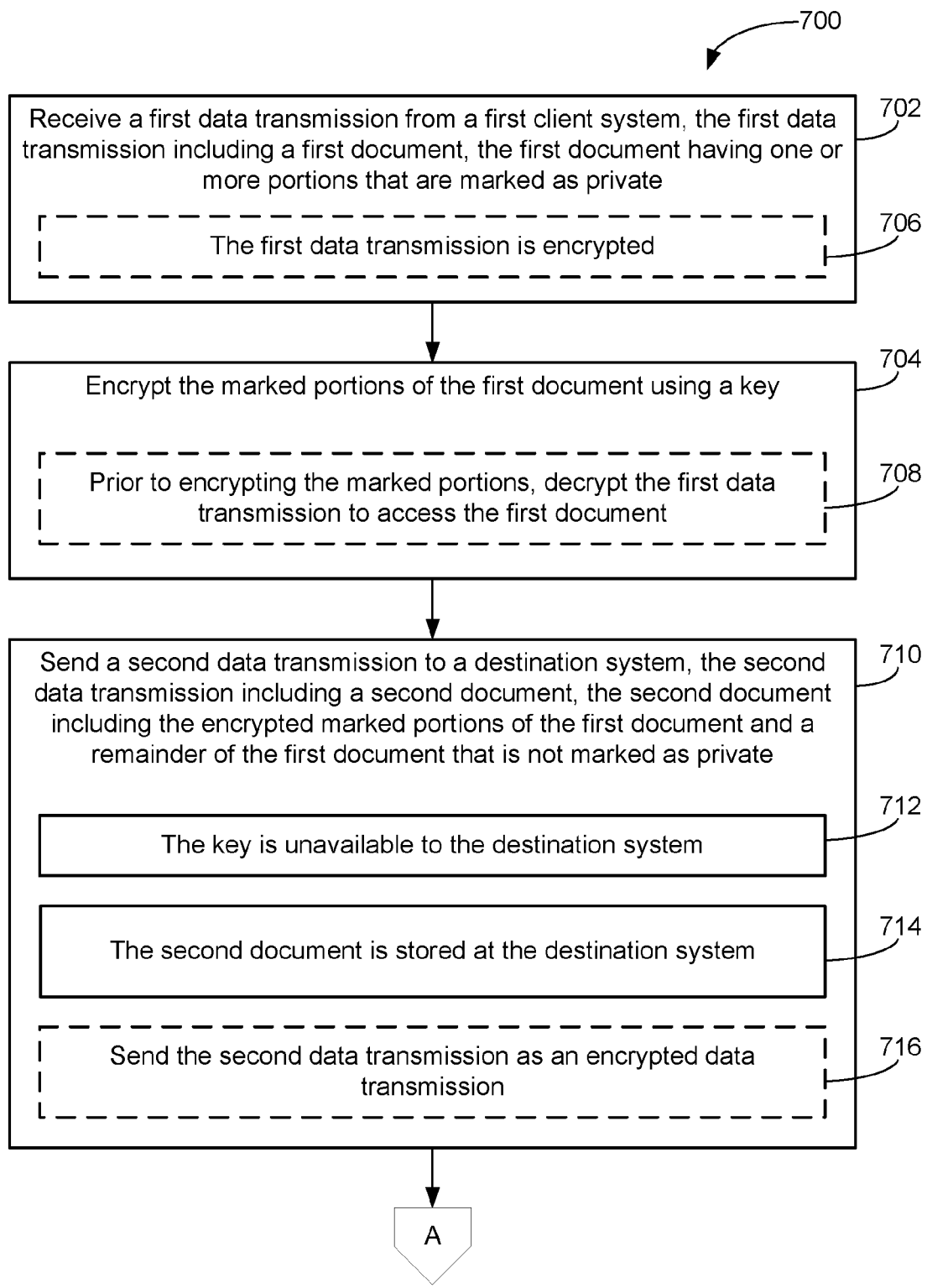
FIGS. 7A-7B are flow diagrams illustrating a process for transmitting a document to a destination system for storage, according to some embodiments.
Figure 7B:
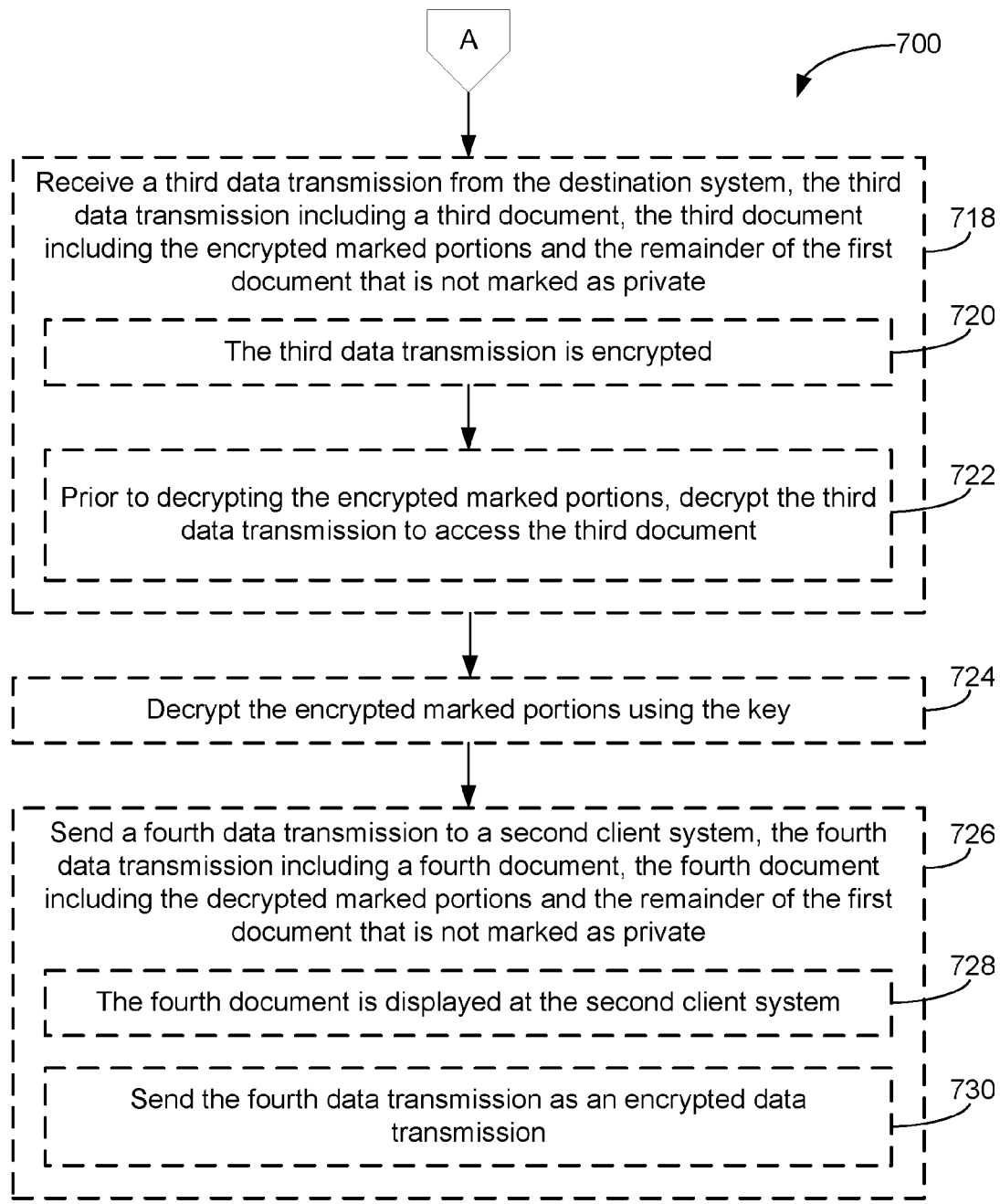

FIGS. 7A-7B are flow diagrams illustrating a process 700 for transmitting a document to a destination system for storage, according to some embodiments. Each of the operations shown in FIGS. 7A-7B may correspond to instructions stored in a computer memory or computer readable storage medium. In some embodiments, process 700 may be implemented at a privacy proxy system 106.

The privacy proxy system receives a first data transmission from a first client system (702). The first data transmission includes a first document, which has one or more portions marked as private. A first document may be sent from a client system (e.g., client system 102), with the eventual destination of the document being a destination system (e.g., server system 114). The first document (the "original document" has one or more content portions (or the entirety of the document) marked as requiring more restrictive security or privacy (e.g., may be read by only certain users). The privacy proxy system, as an intermediary between the client system and the destination system, receives the document in a data transmission from the client system.

The privacy proxy system encrypts the marked portions of the first document using a key (704). The document encryption/decryption module 206 encrypts the portions of the first document that are marked as private using any suitable key-based encryption algorithm or cipher and a key 108 appropriate for the encryption algorithm/cipher. The result of the encryption operation is a partially encrypted version of the first document (which may be called the "partially encrypted" first document), where the marked portions of the first document are encrypted and the remainder of the first document that is not marked as private (the "unmarked remainder") is not encrypted.

In some embodiments, the first data transmission is encrypted (706), and prior to encrypting the marked portions, the privacy proxy system decrypts the first data transmission to access the first document (708). The first data transmission may be an encrypted transmission in accordance with a secure communication protocol (e.g., SSL, TLS). After receiving the first data transmission but prior to encrypting the marked portions, the privacy proxy system extracts the first document from the first data transmission by decrypting the first data transmission in accordance with the secure communication protocol, in order to access the first document for the operation of encrypting the marked portions.

The privacy proxy system sends a second data transmission to a destination system (710). The second data transmission includes a second document, which includes the encrypted marked portions of the first document and the unencrypted unmarked remainder of the first document. In some embodiments, the second document is the partially encrypted first document; the second document is the first document, with the marked portions encrypted. In some other embodiments, the second document is a new document generated anew from the encrypted marked portions of the first document and the unencrypted, unmarked remainder of the first document. The unmarked remainder is not encrypted beyond any encryption applied to the second data transmission as a whole (e.g., encryption applied to secure the second data transmission in accordance with a secure communication protocol, such as SSL or TLS).

The key needed to decrypt the encrypted marked portions is unavailable to the destination system (712). In some embodiments, the key used to encrypt the marked portions is also not made available, nor provided, to the destination system. Without the decryption key, the destination system cannot easily decrypt the encrypted marked portions of the second document. The destination system may process the second document based on the unencrypted portions (i.e., the unmarked remainder), such as indexing the second document for searching based on the contents of the unmarked remainder or matching a search query to content in the unmarked remainder. An advantage of restricting the availability, to the destination system, of the key needed to decrypt the encrypted marked portions is that security and/or privacy of the marked portions are less likely to be compromised by attacks on the destination system.

The second document is stored at the destination system (714). At the destination system, the second document may be stored in non-volatile memory (e.g., hard disk drive, solid state memory, non-volatile memory associated with a database connected to the destination system).

In some embodiments, the privacy proxy system sends the second data transmission to the destination system as an encrypted data transmission (716). The second data transmission is sent as an encrypted transmission in accordance with a secure communication protocol (e.g., SSL, TLS). The destination system extracts the second document from the second data transmission by decrypting the second data transmission in accordance with the secure communication protocol, in order to access the second document for processing.

In some embodiments, the privacy proxy system receives a third data transmission from the destination system (718). The third data transmission includes a third document, which includes the encrypted marked portions and the remainder of the first document that is not marked as private. In some embodiments, the third document is the second document or a copy of the second document, which, as described above, includes the encrypted marked portions and the unencrypted, unmarked remainder. In some embodiments, the third document is the partially encrypted first document or a copy of the partially encrypted first document.

The privacy proxy system decrypts the encrypted marked portions using the key (724). The privacy proxy system uses an appropriate decryption key and the decryption counterpart of the encryption algorithm/cipher to decrypt the encrypted marked portions in the third document. The result of the decryption operation is the original document, with the marked portions and the unmarked portions unencrypted.

In some embodiments, the third data transmission is encrypted (720), and prior to decrypting the encrypting the marked portions, the privacy proxy system decrypts the third data transmission to access the third document (722). The third data transmission may be an encrypted transmission in accordance with a secure communication protocol (e.g., SSL, TLS). After receiving the third data transmission but prior to decrypting the encrypted marked portions, the privacy proxy system extracts the third document from the third data transmission by decrypting the third data transmission in accordance with the secure communication protocol, in order to access the third document for the operation of decrypting the encrypted marked portions.

In some embodiments, the privacy proxy system sends a fourth data transmission to a second client system, the fourth data transmission including a fourth document, which includes the decrypted marked portions and the remainder of the first document that is not marked as private (726). The fourth document is displayed at the second client system (728). In some embodiments, the fourth document is the first document or a copy of the first document, reconstituted from the third document. For example, the first document may be reconstituted from the third document by decrypting the encrypted marked portions in the third document (which, in some embodiments, is the partially encrypted first document). The privacy proxy system sends the fourth document to the second client system for displaying at the second client system. Depending on the rights of the user who requested the document, the fourth document may be displayed entirely in the clear or with the marked portions obscured or replaced with other content, examples of which are described above with reference to FIGS. 6A-6B In some embodiments, the privacy proxy system sends the fourth data transmission to the second client system as an encrypted data transmission (730). The fourth data transmission may be sent as an encrypted transmission in accordance with a secure communication protocol (e.g., SSL, TLS). The second client system extracts the fourth document from the fourth data transmission by decrypting the fourth data transmission in accordance with the secure communication protocol, in order to access the fourth document for displaying. By sending the fourth data transmission as an encrypted data transmission, the fourth document is protected from compromise by an attack on the fourth data transmission.

In some embodiments, the privacy proxy system sends a request to the destination system for the second document in response to a request from a client system for the first document (i.e., the original document). The client system (e.g., the second client system) sending the request for the original document may be the same client system as, or different client system from, the client system that sent the first data transmission (e.g., the first client system). In response to the request from the privacy proxy system, the destination system sends the third data transmission, with the third document, to the privacy proxy system.

In some embodiments, step 724 (decrypting the encrypted marked portions) is skipped if the appropriate decryption key is not available for the third document, and the fourth data transmission includes the third document instead of the fourth document. At step 728, the third document, which includes the encrypted marked portions and the remainder of the first document that is not marked as private, is displayed at the client system instead of the fourth document.

Figure 8A:
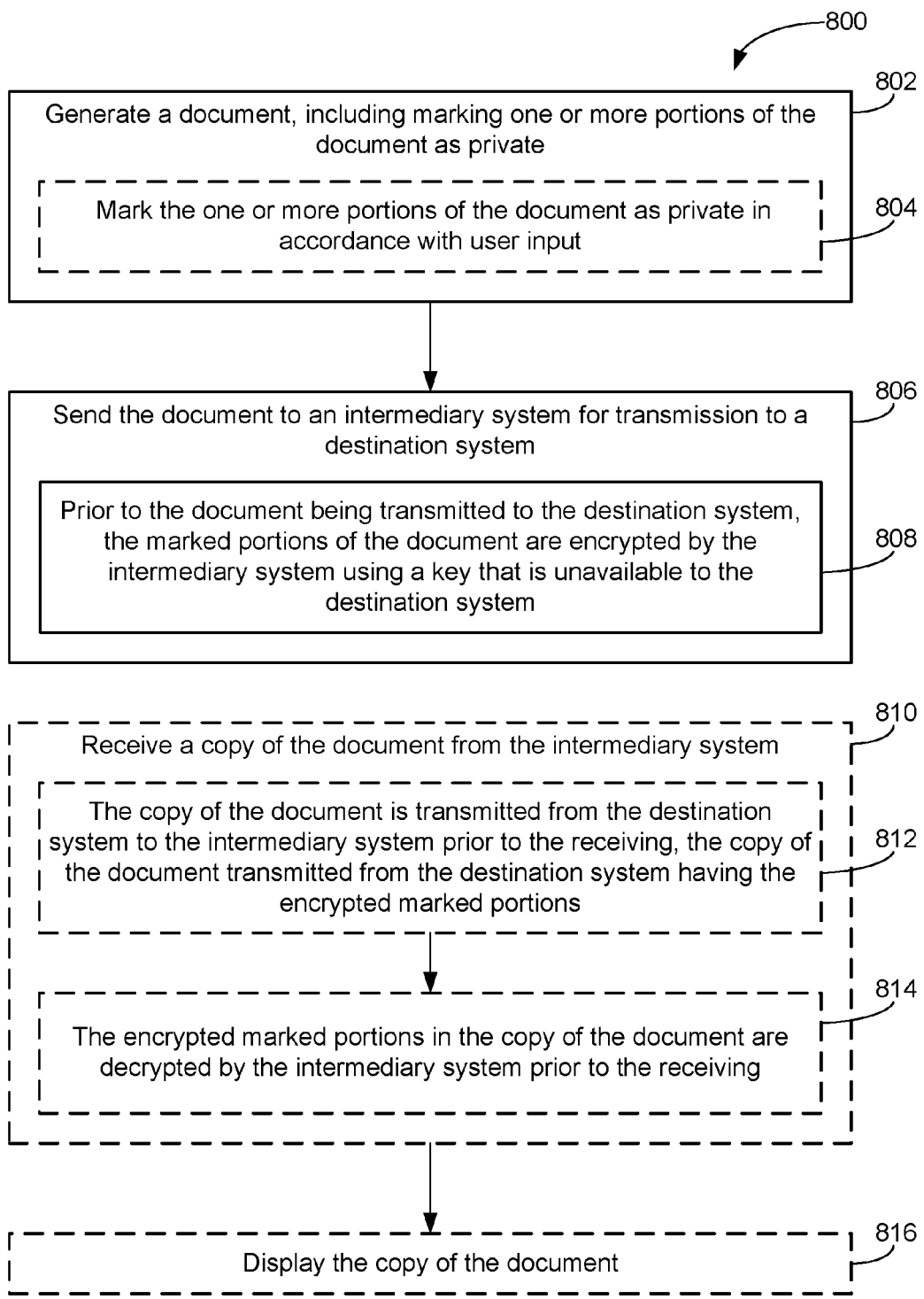
FIGS. 8A-8B are flow diagrams illustrating a process for transmitting a document, according to some embodiments.
Figure 8B:
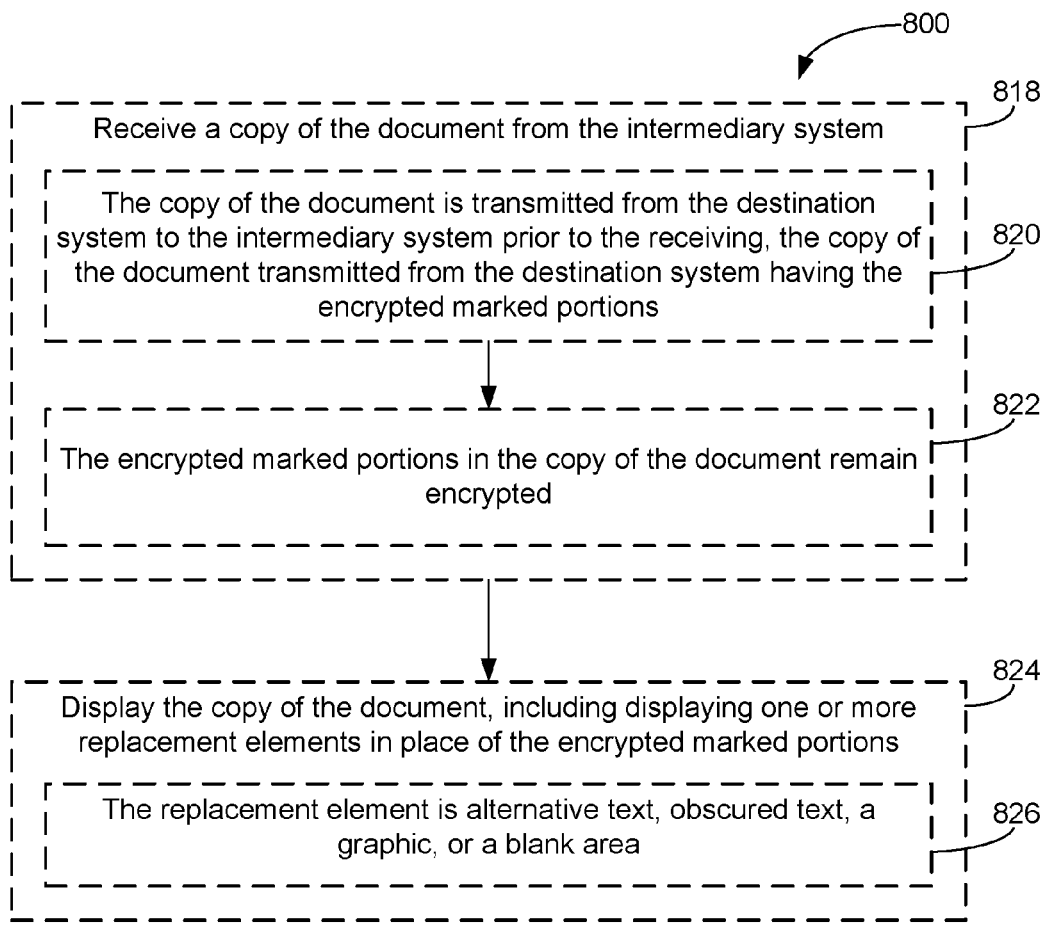

FIGS. 8A-8B are flow diagrams illustrating a process 800 for transmitting a document, according to some embodiments. Each of the operations shown in FIGS. 8A-8B may correspond to instructions stored in a computer memory or computer readable storage medium. In some embodiments, process 800 may be implemented at a client system 102.

The client system generates a document, including marking one or more portions of the document as private (802).

In some embodiments, the client system marks the one or more portions of the document as private in accordance with user input (804). At the client system, a user may input content into an application (e.g., application 104) or open an existing document in the application, and mark one or more portions of the input content or of the existing document content as private. The application generates a document that includes the input content or the content of the existing document, with the portions marked by the user marked as private.

The client system sends the document to an intermediary system for transmission to a destination system (806), where, prior to the document being transmitted to the destination system, the marked portions of the document are encrypted by the intermediary system using a key that is unavailable to the destination system (808). For example, the client system sends the document to a privacy proxy system 106, and the privacy proxy system 106 sends the document to a server system 114. The marked portions of the document is encrypted by the intermediary system using a key 108 that is not made available to the server system 114 prior to being sent to the server system 114.

In some embodiments, the client system receives a copy of the document from the intermediary system (810), where the copy of the document is transmitted from the destination system to the intermediary system prior to the receiving, the copy of the document transmitted from the destination system include the encrypted marked portions (812). In response to a request from the client system for the document, the privacy proxy system retrieves a partially encrypted document corresponding to the requested document from the server system.

In some embodiments, the encrypted marked portions in the copy of the document are decrypted by the intermediary system prior to the receiving (814). The privacy proxy system decrypts the partially encrypted document to reconstitute a copy of the requested document. The copy of the requested document is sent by the privacy proxy system and received by the client system.

In some embodiments, the client system displays the copy of the document (816). The copy of the document, including the marked portions, may be displayed in the clear (as in FIG. 6A, for example) by the client system to the requesting user, if the user is one that has the requisite rights to read the marked portions. If the user does not have rights to read the marked portions, when displaying the marked portions, the application 104 may obscure or replace the marked portions on the display with one or replacement elements or other content (as in FIG. 6B, for example).

In some embodiments, the client system receives a copy of the document from the intermediary system (818), where the copy of the document is transmitted from the destination system to the intermediary system prior to the receiving, the copy of the document transmitted from the destination system include the encrypted marked portions (820). In response to a request from the client system for the document, the privacy proxy system retrieves a partially encrypted document corresponding to the requested document from the server system.

In some embodiments, the encrypted marked portions remain encrypted (822). The privacy proxy system maintains the encryption on the partially encrypted document. The partially encrypted document is sent by the privacy proxy system and received by the client system.

In some embodiments, the client system displays the copy of the document, including displaying one or more replacement elements in place of the encrypted marked portions (824). The marked portions, as they remain encrypted, are not displayed in the clear. The application 104 may obscure or replace the marked portions on the display with one or more replacement elements or other content (e.g., alternative content 604-B, FIG. 6B).

In some embodiments, the replacement element or other content is alternative text, obscured text, a graphic, or a blank area (826). The marked portions, when they are not displayed in the clear, may be replaced with one or more replacement elements, on the display, for display purposes. The replacement may be alternative text (e.g., a message informing the user that the content in the marked portions is private), obscured text (the text in the marked portions blacked out or obscured by a mosaic effect, to resemble redacted text), a blank area, or a graphic (e.g., an icon giving visual indication that the marked portions are restricted).

Figure 9:
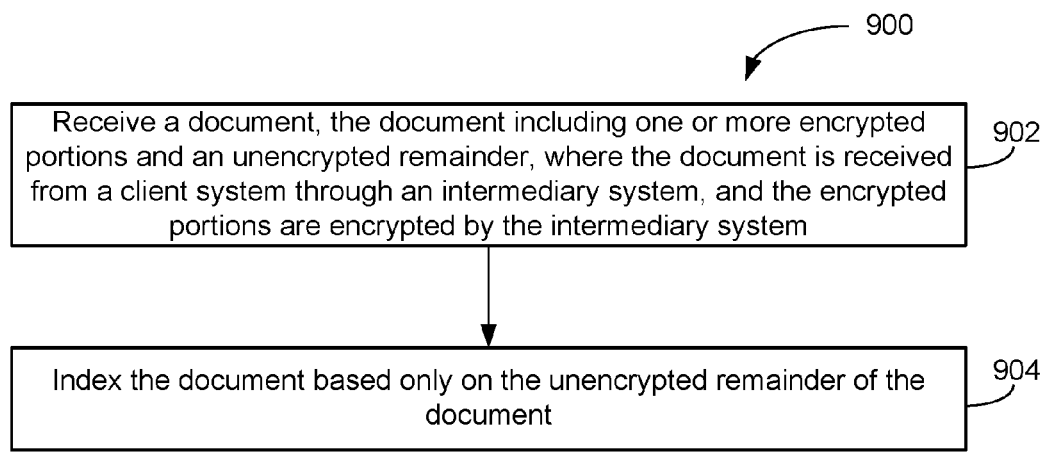
FIG. 9 is a flow diagram illustrating a process for indexing a document for searching, according to some embodiments.

FIG. 9 is a flow diagram illustrating a process 900 for indexing a document for searching, according to some embodiments. Each of the operations shown in FIG. 9 may correspond to instructions stored in a computer memory or computer readable storage medium. In some embodiments, process 900 may be implemented at a server system 114.

A document is received by the server system (902). The received document includes one or more encrypted portions and an unencrypted remainder. Thus, portions of the document are encrypted (and thus those portions appear to be, before decryption, random data) and the remainder of the document is in the clear. In some embodiments, the received document is a partially encrypted document that originated from a client system 102 through an intermediary system (e.g., a privacy proxy system 106) and is partially encrypted by the intermediary system (e.g., the partially encrypted document described above with reference to FIGS. 7A-7B, 8A, 8B). The original document that yielded the partially encrypted document has one or more portions marked as private and an unmarked remainder. The portions marked as private correspond to the encrypted portions in the received document, and the unmarked remainder corresponds to the unencrypted remainder in the received document.

The document is indexed based only on the unencrypted remainder of the document (904). The received document is indexed for searching, but the indexing for the document is based on the unencrypted portions and not at all on the encrypted portions; the encrypted portions appear as random data and thus are not a useful basis for indexing. Further, a key for decrypting the received document is not available to nor provided to the server system 114. Thus, the server system cannot easily decrypt the encrypted portions of the received document to access the contents. Thus, the indexing of the document is based on the unencrypted remainder, and the server system 114 attempt to match received search queries to the unencrypted remainder.

In some embodiments, the privacy proxy system 106, when encrypting a document 111, may add additional metadata to the document. For example, the privacy proxy system 106 may add metadata indicating the version of the key used to encrypt the document. As another example, the privacy proxy system 106 may add additional rights metadata (e.g., corporate-wide special rights policies) to the document.

As described above, the application 104 is configured to enable a user to mark discrete portions of a document as private. In some embodiments, a marked document includes metadata indicating the portions that are marked, where the metadata follows a protocol. The application 104 and/or the plug-in 202 are configured to understand and follow the protocol with respect to generating the data indicating the marked portions and determining whether a document has marked portions and the locations of those marked portions within the document. The privacy proxy system 106 is configured to understand and follow the protocol, so that the encryption and decryption can be limited to the marked portions. In some embodiments, the server system 106 is also configured to understand and follow the protocol, so that the server system 106 knows that a document includes marked portions and avoid those marked portions when processing the document (e.g., when indexing the document).

In some embodiments, the privacy proxy system 106 has a list or database of server systems 106 that are configured to understand and follow the protocol described above. The privacy proxy system 106 may send partially encrypted documents only to the server systems 106 in the list/database. Additionally, even if a partially encrypted document is sent to a server system 106 that does not follow the protocol described above, the privacy of the partially encrypted document is still protected because the destination server system 106 does not have the key needed to decrypt the document.

It should be appreciated that the encryption and/or decryption keys (e.g., key(s) 108) described above may refer to one or more keys. For example, in some embodiments, a key is used for both encryption and decryption. In some other embodiments, one key is used for encryption and another for decryption. Further, multiple keys, including different versions, may be used for encryption and/or decryption using one algorithm or multiple different algorithms (e.g., a set of keys for encryption/decryption using one algorithm and another set of keys for encryption/decryption using another algorithm). The appropriate key that is used in the operations described above should be, to one of ordinary skill in the art, apparent from the context.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. The embodiments were chosen and described in order to best explain the principles of the invention and its practical applications, to thereby enable others skilled in the art to best utilize the invention and various embodiments with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A method, comprising:
   at a computer system having one or more processors and memory storing one or more programs configured for execution by the one or more processors:
   receiving authentication credentials for a user from a client device;
   receiving a request from the user at the client device for content stored on a remote storage system, wherein a portion of the content is encrypted and a corresponding decryption key is available only at the computer system and accessible only by the computer system, and wherein a remaining portion of the content is unencrypted;
   retrieving the content from the remote storage system, including the encrypted portion and the unencrypted portion;
   using the received authentication credentials to determine whether the user is authorized to view the encrypted portion of the content;
   when it is determined that the user is not authorized to view the encrypted portion of the content:
   forming alternative content by replacing the encrypted portion of the content with a substitute element; and
   transmitting the alternative content to the client device; and
   when it is determined that the user is authorized to view the encrypted portion of the content:
   decrypting the encrypted portion of the content using the decryption key, and combining the decrypted portion with the remaining unencrypted portion to form updated content; and
   transmitting the updated content to the client device.

2. The method of claim 1, wherein the substitute element is selected from the group consisting of obscured text, a graphic, a blank area, or alternative text indicating that the encrypted portion has been omitted.

3. The method of claim 1, wherein the encrypted portion of the content is contiguous.

4. The method of claim 1, wherein the encrypted portion of the content comprises two or more non-contiguous segments.

5. The method of claim 1, further comprising when the user is authorized to view the encrypted portion of the content:
   receiving a modified version of the updated content from the client device, wherein the modified version of the updated content includes one or more privacy marked portions;
   encrypting the privacy marked portions of the modified version of the updated content to form partially encrypted modified content; and
   transmitting the partially encrypted modified content to the remote storage system, wherein the partially encrypted modified content replaces the content.

6. The method of claim 1, wherein the content is a file.

7. The method of claim 1, wherein the content is a document.

8. A computer system, comprising:
   one or more processing units; and
   memory storing one or more programs configured for execution by the one or more processing units, wherein the one or more programs include instructions for:
   receiving authentication credentials for a user from a client device;
   receiving a request from the user at the client device for content stored on a remote storage system, wherein a portion of the content is encrypted and a corresponding decryption key is available only at the computer system and accessible only by the computer system, and wherein a remaining portion of the content is unencrypted;
   retrieving the content from the remote storage system, including the encrypted portion and the unencrypted portion;
   using the received authentication credentials to determine whether the user is authorized to view the encrypted portion of the content;

when it is determined that the user is not authorized to view the encrypted portion of the content:
  forming alternative content by replacing the encrypted portion of the content with a substitute element; and
  transmitting the alternative content to the client device; and
when it is determined that the user is authorized to view the encrypted portion of the content:
  decrypting the encrypted portion of the content using the decryption key, and combining the decrypted portion with the remaining unencrypted portion to form updated content; and
  transmitting the updated content to the client device.

9. The computer system of claim 8, wherein the substitute element is selected from the group consisting of obscured text, a graphic, a blank area, or alternative text indicating that the encrypted portion has been omitted.

10. The computer system of claim 8, wherein the encrypted portion of the content is contiguous.

11. The computer system of claim 8, wherein the encrypted portion of the content comprises two or more non-contiguous segments.

12. The computer system of claim 8, wherein the one or more programs further include instructions for:
  when the user is authorized to view the encrypted portion of the content:
    receiving a modified version of the updated content from the client device, wherein the modified version of the updated content includes one or more privacy marked portions;
    encrypting the privacy marked portions of the modified version of the updated content to form partially encrypted modified content; and
    transmitting the partially encrypted modified content to the remote storage system, wherein the partially encrypted modified content replaces the content.

13. The computer system of claim 8, wherein the content is a file.

14. The computer system of claim 8, wherein the content is a document.

15. A non-transitory computer readable storage medium storing one or more programs configured for execution by one or more processors of a computer system, the one or more programs comprising instructions for:
  receiving authentication credentials for a user from a client device;
  receiving a request from the user at the client device for content stored on a remote storage system, wherein a portion of the content is encrypted and a corresponding decryption key is available only at the computer system and accessible only by the computer system, and wherein a remaining portion of the content is unencrypted;
  retrieving the content from the remote storage system, including the encrypted portion and the unencrypted portion;
  using the received authentication credentials to determine whether the user is authorized to view the encrypted portion of the content; and
    transmitting the updated content to the client device; and
  when it is determined that the user is not authorized to view the encrypted portion of the content:
    forming alternative content by replacing the encrypted portion of the content with a substitute element; and
    transmitting the alternative content to the client device; and
  when it is determined that the user is authorized to view the encrypted portion of the content:
    decrypting the encrypted portion of the content using the decryption key, and combining the decrypted portion with the remaining unencrypted portion to form updated content; and
    transmitting the updated content to the client device.

16. The computer readable storage medium of claim 15, wherein the substitute element is selected from the group consisting of obscured text, a graphic, a blank area, or alternative text indicating that the encrypted portion has been omitted.

17. The computer readable storage medium of claim 15, wherein the encrypted portion of the content is contiguous.

18. The computer readable storage medium of claim 15, wherein the encrypted portion of the content comprises two or more non-contiguous segments.

19. The computer readable storage medium of claim 15, wherein the one or more programs further comprise instructions for:
  when the user is authorized to view the encrypted portion of the content:
    receiving a modified version of the updated content from the client device, wherein the modified version of the updated content includes one or more privacy marked portions;
    encrypting the privacy marked portions of the modified version of the updated content to form partially encrypted modified content; and
    transmitting the partially encrypted modified content to the remote storage system, wherein the partially encrypted modified content replaces the content.

20. The computer readable storage medium of claim 15, wherein the content is a file.

* * * * *